Dec. 12, 1967    E. L. H. HOFFMANN ET AL    3,358,141
IMMOBILIZER FOR X-RAY ANALYSIS HAVING PRESSURE
FUNCTIONING FASTENING MEANS
Filed April 2, 1965    2 Sheets-Sheet 1
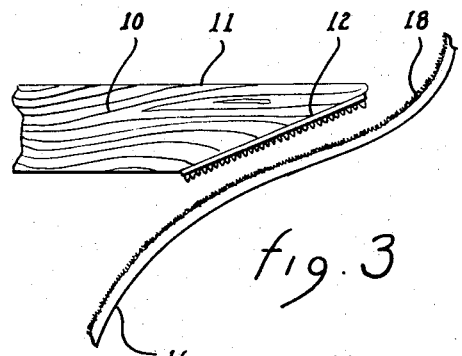
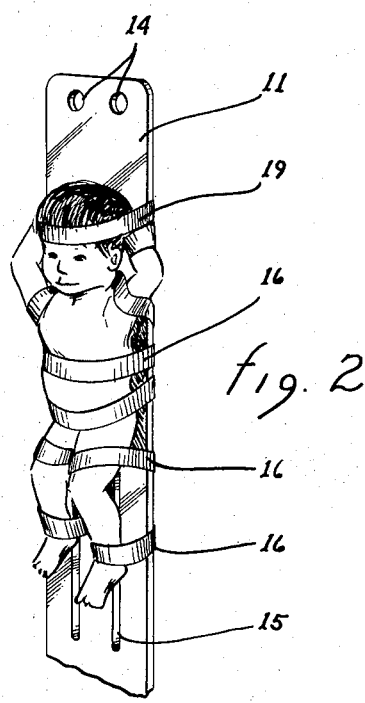
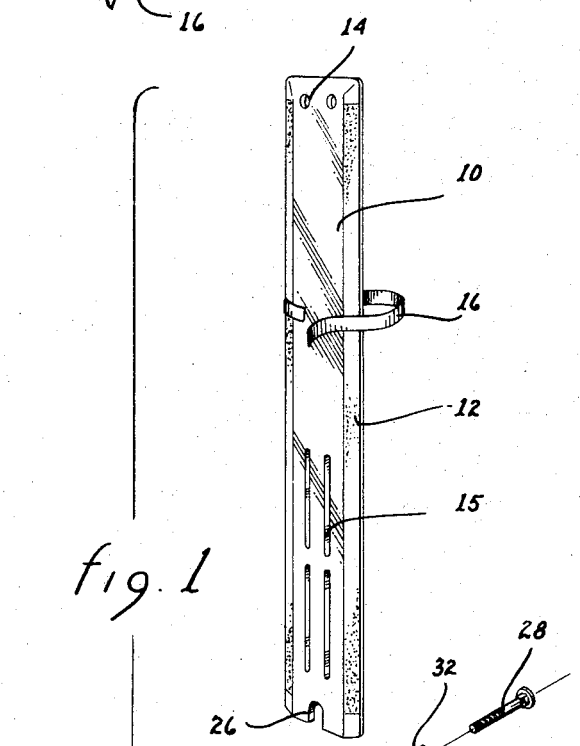
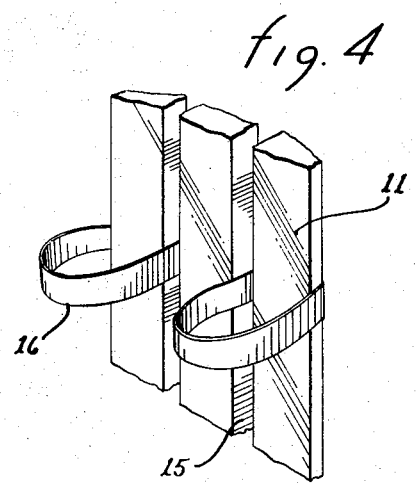
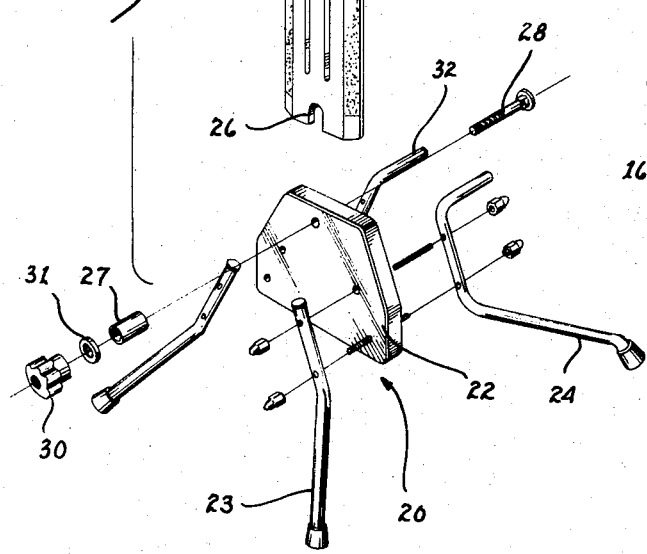
INVENTORS
ERWIN L. H. HOFFMANN
FREDERICK W. BIRCH
BY
*McLaughlin, Cahill & Drummond*
ATTORNEYS Dec. 12, 1967  E. L. H. HOFFMANN ET AL  3,358,141
IMMOBILIZER FOR X-RAY ANALYSIS HAVING PRESSURE
FUNCTIONING FASTENING MEANS
Filed April 2, 1965  2 Sheets-Sheet 2

INVENTORS
ERWIN L.H. HOFFMANN
FREDERICK W. BIRCH
BY
McLaughlin, Cahill & Drummond
ATTORNEYS

United States Patent Office 3,358,141
Patented Dec. 12, 1967

1

3,358,141
IMMOBILIZER FOR X-RAY ANALYSIS HAVING
PRESSURE FUNCTIONING FASTENING MEANS
Erwin L. H. Hoffmann and Frederick W. Birch, Phoenix, Ariz., assignors to Bix Board Company, Scottsdale, Ariz., a partnership
Filed Apr. 2, 1965, Ser. No. 444,981
4 Claims. (Cl. 250—50)

ABSTRACT OF THE DISCLOSURE

An immobilizer device for use in making X-ray examinations of infants. The device consists of an elongated radiotransparent board having beveled edges, substantially vertical slots which cooperate with radiotransparent strap members to secure the infant to the board, and a base plate which may be used to support the board in a substantially vertical position.

Our invention relates to an immobilizer for use in conjunction with X-ray techniques, and more particularly to an immobilizer adapted for use with children.

The use of X-rays for obtaining shadow images of various parts of the human body on radiographic film and in fluoroscopy techniques is well known. Particularly when images are to be recorded on film, it is essential that the subject be maintained substantially motionless. Motion on the part of the subject being X-rayed has the tendency of blurring the image produced, thus making accurate reading of the radiograph and formulating a diagnosis therefrom exceedingly difficult. Similarly in fluoroscopy techniques, motion on the part of the subject being fluoroscoped tends to make accurate reading and diagnosis difficult.

While adults are ordinarily capable of holding themselves substantially motionless for the requisite amount of time, children, particularly infants, have more difficulty. In the past, it has been common for a technician or member of the family of the infant to hold him during the X-ray or fluoroscopy procedure. This method has proved unsatisfactory for a number of reasons. First of all, the correct degree of immobility is difficult to obtain without applying excessive pressure to the child and, secondly, the person holding the child is exposed to radiation. In the case of technicians who are working with dangerous X-rays a large percentage of the time, an accumulation of X-rays due to exposure from holding infants or small children could be harmful or even fatal.

Accordingly, it is a principal object of our invention to provide an apparatus which will substantially completely immobilize an infant.

It is another object of our invention to provide an apparatus which may be moved to adjust the positioning of the infant for various X-ray positions without moving the child relative to the apparatus.

It is still another object of our invention to provide an immobilization apparatus for infants which is self-standing and need not be supported by a technician or other human helper.

Other objects and advantages of our invention will become apparent to those skilled in the art in the course of the following specification and claims when taken in view of the accompanying drawings.

Briefly, our invention comprises a thin, substantially radio transparent board member having pressure-func-

2 tioning fastening means secured to its back side. We also provide a plurality of strap members which are in the form of thin, radiotransparent elastic strips having pressure-functioning fastening means secured near each end of the inside surfaces thereof. In use, the strip members are passed around the body and limbs of an infant or other subject who is positioned against the front side of the board member. The ends of the strap members are fastened to the back side of the board member by mating the pressure-functioning fastening means and applying pressure thereto. A removable stand assembly is also provided so that the board member may be mounted in substantially vertical position with a subject immobilized thereby.

A better understanding of our invention may be obtained in view of the accompanying drawings in which:

FIGURE 1 is an exploded isometric view illustrating the relationships of various parts of our immobilizer;

FIGURE 2 is a partial isometric elevation illustrating one position in which a subject may be immobilized;

FIGURE 3 is a partial sectional plan view illustrating the pressure-functioning fastening means used in conjunction with our invention;

FIGURE 4 is a partial isometric illustrating one refinement of our immobilizer;

Figure 5:
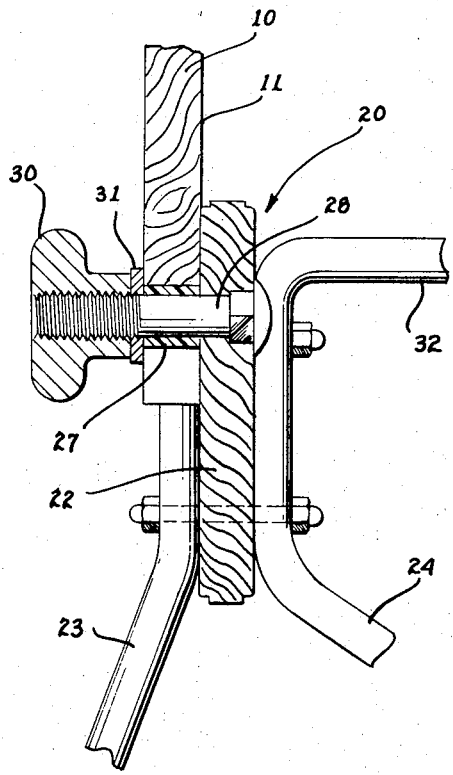
FIGURE 5 is a partial sectional elevation illustrating one method of mounting the board member.

Referring to the drawings, a board member 10 has a substantially flat front side 11. The board member 10 is of a substantially radiotransparent material. By the term "radiotransparent material" as used in this application, we mean those materials which are substantially radiotransparent when ordinary X-ray techniques used in human radiography are employed. A back side of board member 10 is beveled along both side edges. The beveled portion 12 of the board member serves a dual function. One important function of the beveling is to provide a gradual diminishing in thickness of the board member toward its edges to reduce the possibility of a shadow appearing on an X-ray image. The beveled portion 12 also facilitates the use of fastening means as will be explained more fully hereinafter.

A pair of apertures 14 are defined by the board member 10 near its top portion. The apertures serve as means by which the board member may be gripped and lifted. Other handle means may be employed, of course, but we have discovered that the apertures provide a minimum of shadow effect on X-ray pictures. Vertical slots 15 are also defined by the board member 10 near the bottom portion thereof. As particularly shown in FIGURES 2 and 4, the vertical slots 15 serve to aid in restraint of lower limb members of a subject being immobilized in accordance with our invention.

Pressure-functioning fastening means is secured to the board member 10 on the beveled portion 12 thereof. The fastening means extends substantially the length of the beveled portion 12 of the board member. Pressure-functioning fastening means of the type suitable for use in accordance with our invention has a male portion defining a plurality of small hooks and a female portion formed of a soft fabric sometimes known as a "pile." A preferable fastening means of the type herein described is known as "Velcro." We prefer to secure the male, or hook, portion of the Velcro material to the beveled portion of the board member.

Figure 6:
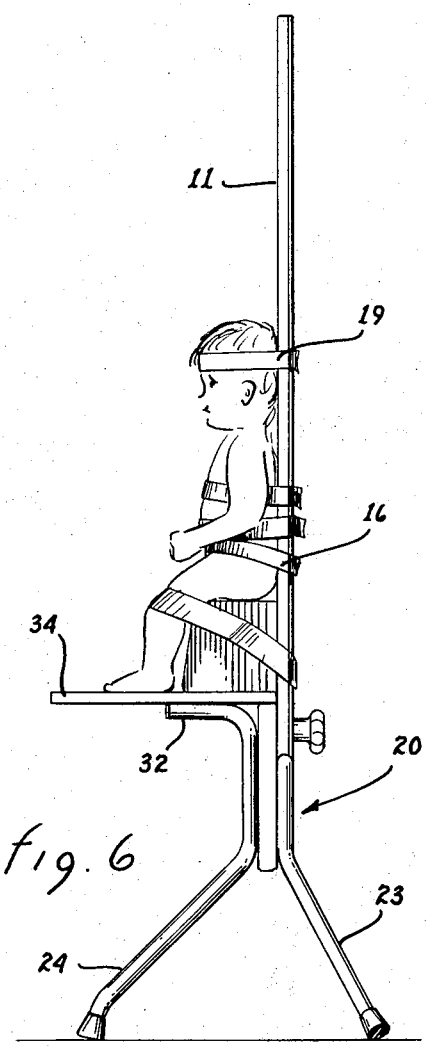
FIGURE 6 is an elevation illustrating another position in which a subject may be immobilized.
Figure 7:
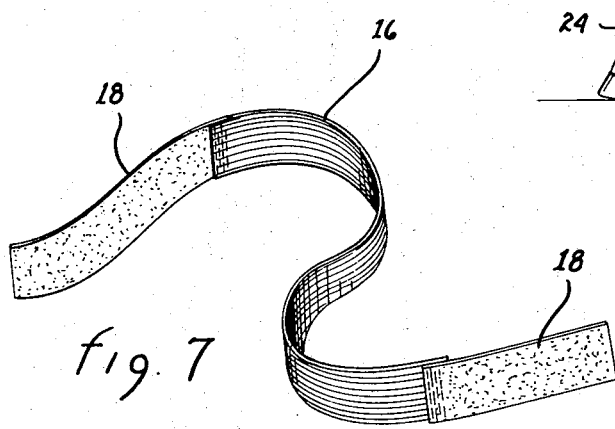
FIGURE 7 is an isometric illustrating a strap member in accordance with our invention.

Strap members 16 are formed of strips or tapes of substantially radiotransparent material and are preferably slightly elastic. Each strap member 16 has a portion of female, or pile, Velcro 18 attached to each end thereof with the pile facing the inside portion of the strap member which will ultimately contact the subject being immobilized. In use, the strap members 16 are passed around the subject and the pile portion 18 of the strap members is brought in contact with the male Velcro portion secured to the board member. As shown in FIGURES 2 and 6, the number of positions in which a subject may be immobilized is practically limitless. Strap members 19 which contact the forehead or chin of the subject being immobilized may be additionally modified by having an inner surface which is rubberized or otherwise smooth to prevent abrasion. As shown in FIGURES 2 and 4, immobilization of the lower limbs is accomplished by passing one or more strap members through the slots 15 defined by the board member over the lower limbs of the subject and fastening the pile portions 18 of the strap members 16 to the male Velcro mounted on the back side of the board member.

In many situations, a wall cassette is preferably employed and the subject should be in a vertical position. For this reason, a mounting or stand member, generally designated 20, is provided. The stand member has a base plate 22 which is supported by rear leg members 23 and front leg members 24 suitably attached by bolts or the like. A notch 26 defined by the bottom of the board member engages a collar 27 fitting over a bolt 28 passed through an aperture defined by the base plate 22. A knob 30 engages the threads of the bolt 28 and thereby forces a washer 31 into restraining contact with the board member 10. Collar 27 is particularly useful in preventing the knob member from being overly tightened when the board member is removed from the stand. In this manner, a board having a patient restrained thereon may be brought into engagement with the bolt and collar without need to undo or open the knob. Collar 27 is preferably of a slightly deformable plastic material such as Teflon, high-density polyethylene, or the like, and further serves to put a locking pressure on the lock knob 30 and prevent inadvertent or unintentional loosening thereof.

Front legs 24 in the stand assembly have horizontal, forwardly extending portions 32 which may be employed as support means for a cassette 34 in the manner illustrated in FIGURE 6, or otherwise as desired. FIGURE 6 illustrates a positioning particularly useful for taking X-rays of the pedal extremities of an infant where it is necessary that some pressure be exerted on the pedal extremities to obtain a requisite positioning of the bones therein.

While the drawings and description herein have dealt primarily with the use of our immobilizer in a vertical position, it is to be understood that the entire assembly including the stand may be employed in a horizontal position, or the board member may be quickly removed from the stand with the infant restrained thereon and positioned on an X-ray table or otherwise as desired.

We have found that straight-grained redwood and mahogany are particularly suitable for use as board members in accordance with our invention but it is to be understood that any other rigid radiotransparent material may be employed as desired. Strap members employed in a preferred embodiment of our invention are fabricated of an elastic tape having rubberized strands running longitudinally of the strap and have Velcro pile attached to the ends thereof. Other materials and other fastening means may of course be employed as strap members in accordance with our invention. The particular pressure-functioning fastening means employed is not critical but should be capable of fastening the strap members at any random position along the length of the board member, thereby to adapt to different sizes of subjects and different particular radiographic positions thereof. We prefer to employ Velcro as our pressure-functioning fastening means.

Various modifications may be made in our invention without departing from the spirit or scope thereof, and it is to be understood that we limit ourselves only as defined by the appended claims.

We claim:
1. An immobilizer comprising in combination an elongated radiotransparent board member defining a plurality of substantially vertical slots and having front and back sides, the back side of said board member having beveled elongated edges, a stand member comprising a base plate and a plurality of leg members secured to said base plate, means for securing said board member to said base plate whereby said board member may be supported by said base plate in a substantially vertical position, and a plurality of thin radiotransparent strap members having inside and outside surfaces, said board member and strap members having mating pressure-functioning means secured thereto, said strap members having said fastening means secured near each end and forming part of the inside surfaces thereof and said board member having said fastening means secured to the beveled portion of the back side, whereby said strap members restrain and immobilize a subject positioned against the front side of said vertically supported board member.

2. An immobilizer comprising in combination an elongated radiotransparent board member defining a plurality of substantially vertical slots and having front and back sides, the back side of said board member having beveled elongated edges, the bottom of said board member defining a notch, a stand member comprising a base plate adapted to engage said notch defined by said board member and a plurality of leg members secured to said base plate, whereby said board member may be supported in a sustantially vertical position, and a plurality of thin radiotransparent strap members having inside and outside surfaces, said board member and strap members having mating pressure-functioning fastening means secured thereto, said strap members having said fastening means secured near each end and forming part of the inside surfaces thereof and said board member having said fastening means secured to the beveled portion of the back side, whereby said strap members restrain and immobilize a subject positioned against the front side of said vertically supported board member.

3. The immobilizer of claim 2 wherein front leg members secured to said base plate have substantially horizontal forwardly extending portions.

4. An immobilizer comprising in combination an elongated radiotransparent board member defining a plurality of substantially vertical slots and having front and back sides, said board member defining a pair of apertures near the top thereof, the back side of said board member having beveled elongated edges having male pressure-functioning fastening means secured thereto, the bottom of said board member defining a notch, a stand member comprising a base plate having bolts and deformable collar means secured thereto, said bolt means having tightening knob means threaded thereon, said bolt, deformable collar and knob means adapted to engage the notch defined by said board member and secure said board member to said base plate, said base plate having a plurality of leg members secured thereto, said leg members comprising front leg members and rear leg members, said front leg members having substantially horizontal forwardly extending portions, whereby said board member is supported in a substantially vertical position, and a plurality of thin radiotransparent elastic strap members, said strap members having female pressure-functioning fastening means secured near each end thereof, whereby said strap members restrain and immobilize a subject positioned against the front side of said vertically supported board member.

References Cited

UNITED STATES PATENTS

| 3,051,832 | 8/1962 | Pigg | 250—50 |
| 3,136,311 | 6/1964 | Lewis | 128—134 |
| 3,215,834 | 11/1965 | Tayman | 250—54 |
| 3,241,881 | 3/1966 | Carnahan et al. | 297—385 |

WILLIAM F. LINDQUIST, *Primary Examiner.*

RALPH G. NILSON, *Examiner.*

A. L. BIRCH, *Assistant Examiner.*